(12) United States Patent
Joaquin (10) Patent No.: US 11,155,291 B2
(45) Date of Patent: Oct. 26, 2021

(54) SHOPPING CART WITH BAG ATTACHMENT MECHANISM

(71) Applicant: Walmart Apollo, LLC, Bentonville, AR (US)

(72) Inventor: Daniel Anthony Joaquin, Toronto (CA)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/705,620

(22) Filed: Dec. 6, 2019

(65) Prior Publication Data

US 2020/0180672 A1 Jun. 11, 2020

Related U.S. Application Data

(60) Provisional application No. 62/776,746, filed on Dec. 7, 2018.

(51) Int. Cl.
*B62B 3/14* (2006.01)

(52) U.S. Cl.
CPC .......... *B62B 3/1472* (2013.01); *B62B 3/1492* (2013.01)

(58) Field of Classification Search
CPC ......... B62B 3/14; B62B 3/146; B62B 3/1464; B62B 3/1472
See application file for complete search history.

(56) References Cited

U.S. PATENT DOCUMENTS

| | | | | |
|---|---|---|---|---|
| 3,909,034 A | * | 9/1975 | Trubiano | B62B 3/146 280/47.34 |
| 4,560,096 A | * | 12/1985 | Lucas | B62B 3/1464 220/9.4 |
| 9,566,991 B2 | * | 2/2017 | Parker | A47F 13/00 |
| 10,173,708 B1 | * | 1/2019 | Bacallao | B62B 3/146 |
| 2002/0167139 A1 | * | 11/2002 | Prather | B62B 3/146 280/47.35 |
| 2002/0171214 A1 | * | 11/2002 | Prather | B62B 3/142 280/47.35 |
| 2008/0088101 A1 | * | 4/2008 | Ferguson | B62B 1/14 280/33.992 |
| 2015/0246751 A1 | * | 9/2015 | Spivack | A45C 7/0086 224/411 |

(Continued)

FOREIGN PATENT DOCUMENTS

CN 201183502 Y 1/2009

OTHER PUBLICATIONS

Canadian Office Action for Application No. 3,026,875, dated Mar. 4, 2020, 4 pages.

*Primary Examiner* — Brian L Swenson
(74) *Attorney, Agent, or Firm* — Fitch, Even, Tabin & Flannery, LLP (57) ABSTRACT

Shopping carts and mobile shopping baskets equipped with one or more bag attachment mechanisms are discussed. The shopping carts and mobile shopping baskets may include multiple rows of bag attachment mechanisms located at varying distances from a top edge of a cart or basket side wall. The shopping carts and mobile shopping baskets may include bag attachment mechanisms on multiple side walls of the basket. The bag attachment mechanisms may take a number of forms including downward facing loop attachment mechanisms, clipping mechanisms and/or hook mechanisms.

20 Claims, 6 Drawing Sheets

(56) References Cited

U.S. PATENT DOCUMENTS

| | | | |
|---|---|---|---|
| 2016/0167689 A1* | 6/2016 | Haynes | B62B 3/1464 224/411 |
| 2016/0311454 A1* | 10/2016 | Hendrick | B62B 3/1464 |
| 2016/0375921 A1* | 12/2016 | Strawser | B62B 3/1464 224/411 |
| 2018/0304913 A1* | 10/2018 | Fiorello | B62B 3/1472 |
| 2019/0168793 A1* | 6/2019 | Fiorello | B62B 3/10 |

* cited by examiner

SHOPPING CART WITH BAG ATTACHMENT MECHANISM

RELATED APPLICATION

This application claims priority to, and the benefit of, U.S. Provisional Patent Application No. 62/776,746, filed Dec. 7, 2018, the contents of which are incorporated herein by reference in their entirety.

BACKGROUND

In recent years, supermarkets and other retail facilities have embraced new technologies to speed up the shopping process for their customers. For example, some supermarkets now provide mobile devices to their customers, sometimes referred to as "wands", which include bar code scanners that enable the customers to scan each selected item as they travel throughout the store. After scanning the item, the item is placed in the customer's shopping cart. After the customer has selected the last item, the wand can interact with a Point of Sale device in the facility to pay for the items without the customer having to take all of the items out of the shopping cart. In another approach, the customer may use an application associated with the facility that executes on their own phone (or other mobile device). The application and sensors in the customer's mobile device are used to scan or otherwise identify items the customer selects as they travel throughout the store. The items are then placed in the customer's shopping cart. When the customer is finished shopping, the application may allow the customer to pay for the items directly via their mobile device. Alternatively, the application on the customer's mobile device may interact with a Point of Sale device or other sensor in the facility to pay for the items. In either case, the customer is able to exit the facility without having to stop and remove the items from their shopping cart. As a result, the customer is able to leave the facility in a quicker manner after selecting and scanning all of their items than was possible during a traditional trip to the supermarket where the customer had to wait for the items to be individually scanned at the cash register.

BRIEF SUMMARY

Exemplary embodiments provide shopping carts and mobile shopping baskets equipped with one or more bag attachment mechanisms. The shopping carts and mobile shopping baskets may include multiple rows of bag attachment mechanisms located at varying distances from a top edge of a cart or basket side wall. The shopping carts and mobile shopping baskets may include bag attachment mechanisms on multiple side walls of the basket. The bag attachment mechanisms may take a number of forms including downward facing loop attachment mechanisms, clipping mechanisms and/or hook mechanisms.

In one embodiment a shopping cart includes a frame, a set of four wheels mounted on and supporting the frame and a basket supported by the frame. The basket includes a bottom wall, a front side wall, a rear side wall, a first lateral side wall and a second lateral side wall. Each side wall includes a top edge and defines a plane extending below and away from the top edge as well as multiple first and second supports. The first supports for each side wall extend away from the top edge in the direction of the side wall while the second supports extend laterally across each side wall. The second supports extend in a direction substantially perpendicular to a direction of the first supports. The basket also includes at least one loop attachment mechanism projecting downward in a direction away from a top edge of the first lateral side wall. The loop attachment mechanism is located substantially within the defined plane of the first lateral side wall and is located below the top edge of the first lateral side wall.

In another embodiment, a shopping cart includes a frame, a set of four wheels mounted on and supporting the frame and a basket supported by the frame. The basket includes a bottom wall, a front side wall, a rear side wall, a first lateral side wall and a second lateral side wall. Each side wall includes a top edge and defines a plane extending below and away from the top edge as well as multiple first and second supports. The first supports for each side wall extend away from the top edge in the direction of the side wall while the second supports extend laterally across each side wall. The second supports extend in a direction substantially perpendicular to a direction of the first supports. The basket also includes at least one clipping mechanism or hook mechanism located below the top edge of the first lateral side wall that is configured to secure a handle of a bag extending over the top edge of the first lateral side wall.

In a further embodiment, a wheeled shopping basket includes a frame, a set of two wheels mounted on and supporting the frame and a basket supported by the frame. The basket includes a bottom wall, a front side wall, a rear side wall, a first lateral side wall and a second lateral side wall. Each side wall includes a top edge and defines a plane extending below and away from the top edge as well as multiple first and second supports. The first supports for each side wall extend away from the top edge in the direction of the side wall while the second supports extend laterally across each side wall. The second supports extend in a direction substantially perpendicular to a direction of the first supports. The basket also includes at least one loop attachment mechanism projecting downward in a direction away from a top edge of the first lateral side wall. The loop attachment mechanism is located substantially within the defined plane of the first lateral side wall and is located below the top edge of the first lateral side wall.

BRIEF DESCRIPTION OF DRAWINGS

To assist those of skill in the art in making and using the described system and associated methods, reference is made to the accompanying figures. The accompanying figures, which are incorporated in and constitute a part of this specification, illustrate one or more embodiments described in this specification and, together with the description, help to explain the embodiments. Illustrative embodiments are shown by way of example in the accompanying drawings and should not be considered as limiting. In the figures.

DETAILED DESCRIPTION

Described in detail herein are shopping carts and wheeled shopping baskets with bag attachment mechanisms that are particularly suitable for use in an expedited shopping environment.

As discussed above, a number of different techniques have been developed in recent years that aim to expedite the customer's shopping experience by moving the scanning of items needed for checkout to a point in time immediately following the item's selection by the customer at various different locations throughout a retail facility. Following this scanning the items are placed into the customer's shopping cart or basket. However, in order to actually expedite the shopping experience the item should also be placed into a bag in the cart so that when the customer does exit the facility the bags with the items can be removed quickly by the customer. It will be appreciated that if the selected items were to be placed haphazardly in the basket without being bagged they would need to be bagged later by the customer after checkout thereby greatly limiting the time savings provided by the scanning while shopping technique. In order to receive the most time savings from scanning while shopping, the bags in the customer's cart or basket should be in an open position and ready to receive items. Embodiments of the present invention provide bag attachment mechanisms on side walls of the cart or basket that enable a customer's bags to be positioned to optimally receive selected items.

Figure 1:
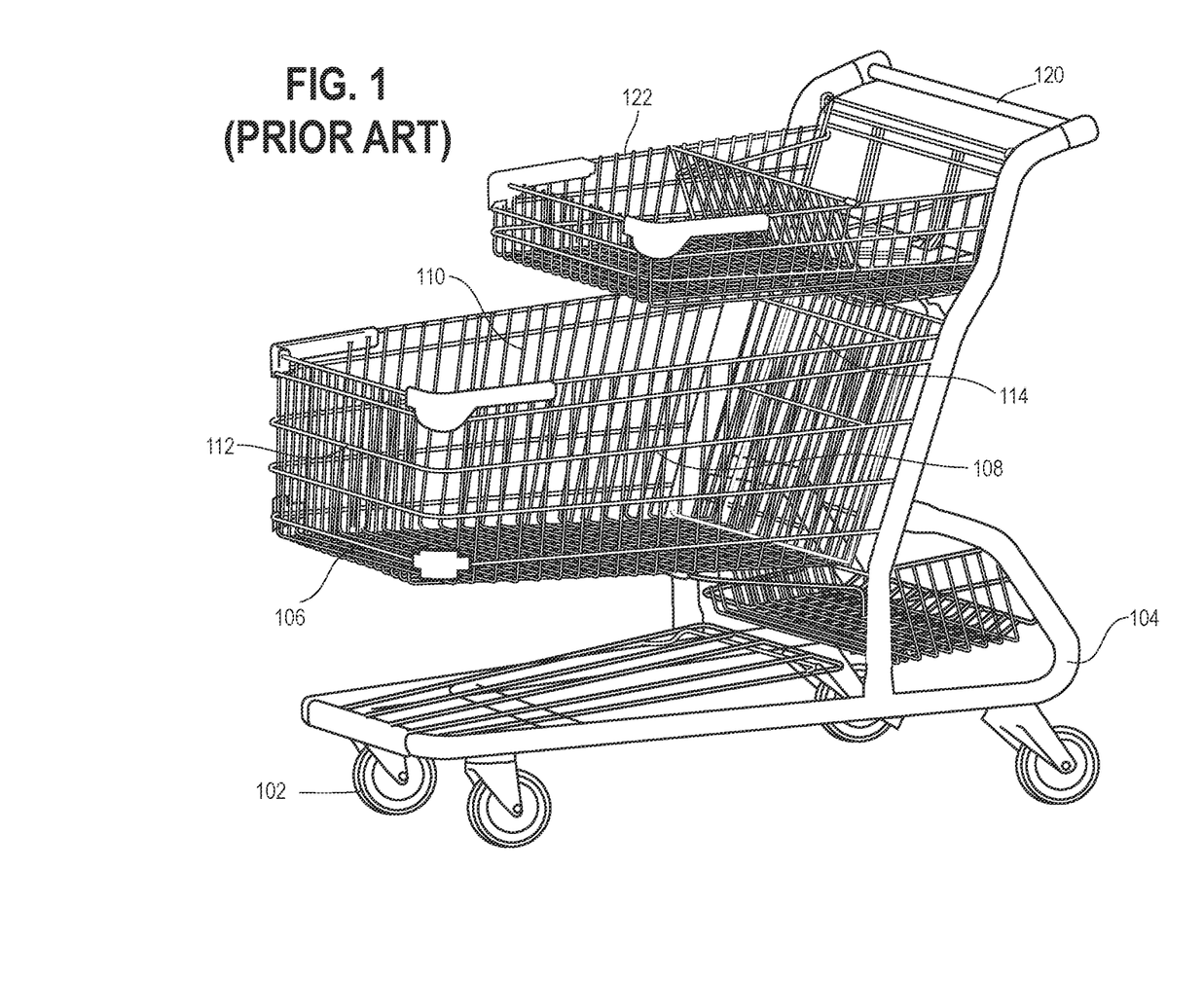
FIG. 1 (prior art) depicts a conventional shopping cart suitable for modification in accordance with embodiments of the present invention.

Before discussing bag attachment mechanisms for carts and baskets provided by embodiments of the present invention, an exemplary conventional shopping cart suitable for modification with bag attachment mechanisms is first discussed. FIG. 1 (prior art) depicts a conventional shopping cart suitable for modification in accordance with embodiments of the present invention. It should be appreciated that the present invention is not limited to modification of the shopping cart design depicted in FIG. 1 as other shopping cart and basket designs may be modified with bag attachment mechanisms within the scope of the present invention. For example, while the shopping cart discussed in FIG. 1 and later figures has a second upper basket, the invention is not so limited and can also include modifications to shopping carts having conventional one basket configurations. Further, while the bag attachment mechanisms described herein are discussed for illustration purposes in the context of improvements to a conventional metal shopping cart design, the bag attachment mechanisms are also applicable to shopping carts and mobile shopping baskets made out of other materials such as, but not limited to, shopping carts constructed in whole or in part of plastic material. Similarly, the bag attachment mechanisms, such as the loop attachment mechanisms, clipping mechanisms and hook mechanisms, discussed herein may also be made out of a variety of materials including, but not limited to, metal, plastic, other materials and/or combinations thereof.

The conventional shopping cart of FIG. 1 includes a set of four wheels 102 supporting a frame 104. The frame 104 supports a basket formed by a bottom wall 106, first and second lateral side walls 108, 110, a front side wall 112 and a rear side wall 114. Each side wall includes a top edge and defines a plane extending below and away from the top edge. The shopping cart may also include other elements in some configurations such as a handle 120 and a second top basket 122. As described below, embodiments may modify conventional shopping carts such as the shopping cart depicted in FIG. 1 with bag attachment mechanisms so as to provide an expedited shopping experience.

Figure 2A:
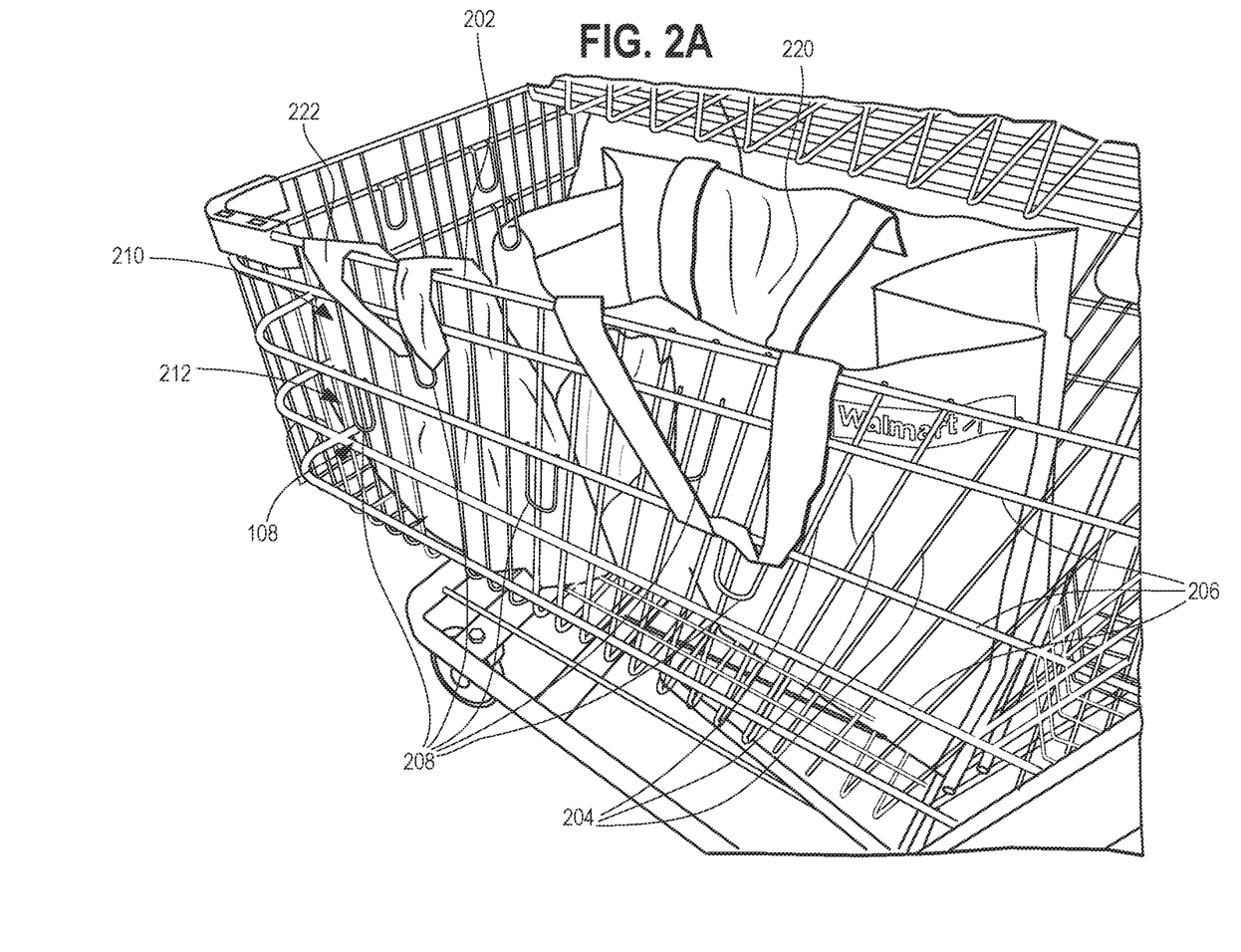
FIG. 2A depicts a shopping cart with downward facing loop attachment mechanisms in an exemplary embodiment.

FIG. 2A depicts a shopping cart with downward facing loop attachment mechanisms in an exemplary embodiment. As depicted in FIG. 2A, first lateral side wall 108 of a shopping cart basket includes first supports 204 and second supports 206. In one embodiment, first supports 204 may extend away from a top edge 202 of first lateral side wall 108 in the direction of the side wall (e.g. the first supports may extend vertically towards the floor). In one embodiment, second supports 206 may extend laterally across first lateral side wall 108. For example, second supports 206 may extend in a direction substantially perpendicular to a direction of the first supports 204. Loop attachment mechanisms 208 project downward in a direction away from top edge 202 of the first lateral side wall 108 and are located substantially within the defined plane of the first lateral side wall. Loop attachment mechanism 208 are located below the top edge of the first lateral side wall. In one embodiment, loop attachment mechanism 208 is physically connected to second support 206 such as through welding or the use of a fastener. In another embodiment, loop attachment mechanism 208 is integrated into second support 206. In a further embodiment, loop attachment mechanism 208 is slideably connected to second support 206 so that it may be moved laterally along second support to change position. In one embodiment, loop attachment mechanism 208 is located in a gap in first lateral side wall 108 provided by removing a portion of first support 204. In a further embodiment, loop attachment mechanism 208 may include connections to two or more adjacent first supports 204.

Loop attachment mechanism 208 projects downward in order to facilitate a solid attachment of a handle of a shopping bag 220, 222 extended from the interior of the cart basket over the top edge 202 of lateral sidewall 108 that is then secured around the loop attachment mechanism as depicted in FIG. 2A. One or more loop attachment mechanisms 208 may be located on first lateral side wall 108, second lateral side wall 110, front side wall 112 and/or rear side wall 114. As depicted in FIG. 2A, loop attachment mechanisms 208 may be provided at different locations in different rows 210, 212 located different distances from top edge 202. The placing of loop attachment mechanisms 208 at differing distances from top edge 202 enables the accommodation of different size bags 220, 222 with different length bag handles while still maintaining the tension necessary to present the bag in an open position to receive items within the basket.

In one embodiment, as depicted in FIG. 2A, a side wall may include two loop attachment mechanisms 208 in a first row located a first distance from a top edge of a side wall and three loop attachment mechanisms in a second row located farther from the top edge. In one embodiment, the loop attachment mechanisms 208 in one row may be offset laterally from loop attachment mechanisms in another row. Alternatively, in another embodiment (not shown), the top row of loop attachment mechanisms in a side wall may include three loop attachment mechanisms while the bottom row includes two loop attachment mechanisms.

In one embodiment, the loop attachment mechanisms described herein are located only on one or more of the lateral side walls of a shopping cart. In another embodiment, the loop attachment mechanisms may be located on the front side wall and/or rear side wall in addition to the lateral side walls of the shopping cart basket in varying numbers and varying configurations.

While the downward facing loop attachment mechanism has certain advantages in maintaining tension as described above, other bag attachment mechanisms are also with the scope of the present invention and may be located at the locations and in the configurations previously described for the loop attachment mechanisms. For example, in one embodiment, the shopping cart is equipped with clipping mechanisms such as spring clip instead of, or in addition to, the loop attachment mechanism previously described. The clipping mechanism may be, in a non-limiting example, a spring clip configured to grasp a handle of a shopping bag. In a further embodiment, the shopping cart is equipped with a hook mechanism instead of, or in addition to, the loop attachment mechanism and clipping mechanism previously described. In a non-limiting example, the hook mechanism may be an integrated piece of a first or second support shaped into a hook shape in a manner sufficient to secure a bag handle stretched over the top edge of a side wall of the shopping cart. The clipping mechanism and/or hook mechanisms may be located substantially within the defined plane of a side wall of the shopping cart basket.

In one embodiment, first supports 204 and second supports 206 may also be oriented in a different manner than that shown in FIG. 2A without departing from the scope of the present invention. For example, first supports 204 may extend diagonally from top edge 202 to the bottom of the side wall and second supports 206 may run substantially perpendicular to the first supports instead of the more vertical and horizontal orientation of the first and second supports shown in FIG. 2A.

Figure 2B:
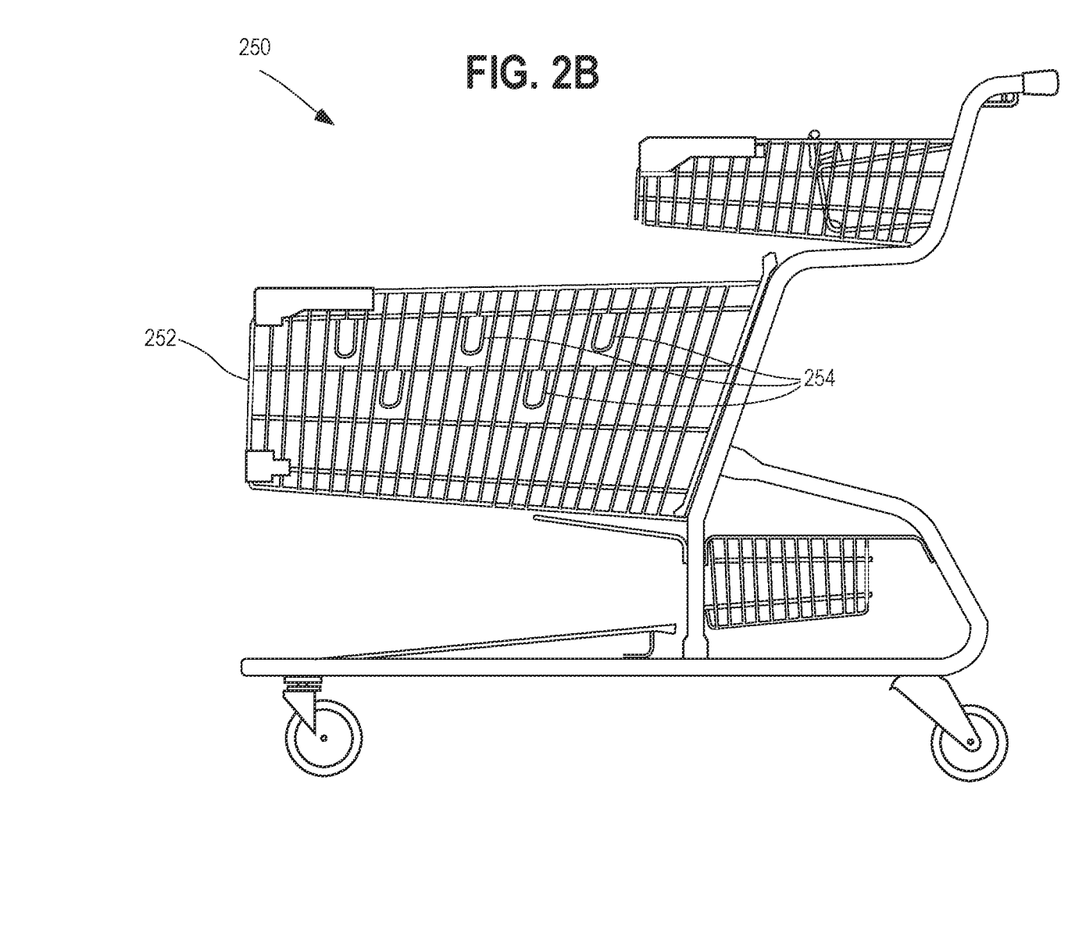
FIG. 2B depicts another view of a two basket shopping cart with downward facing loop attachment mechanisms in an exemplary embodiment.

FIG. 2B depicts another view of a two basket shopping cart with downward facing loop attachment mechanisms in an exemplary embodiment. The two basket shopping cart 250 includes a first lateral side wall 252 with multiple downward facing loop attachments 254 arranged in two rows.

Figure 3:
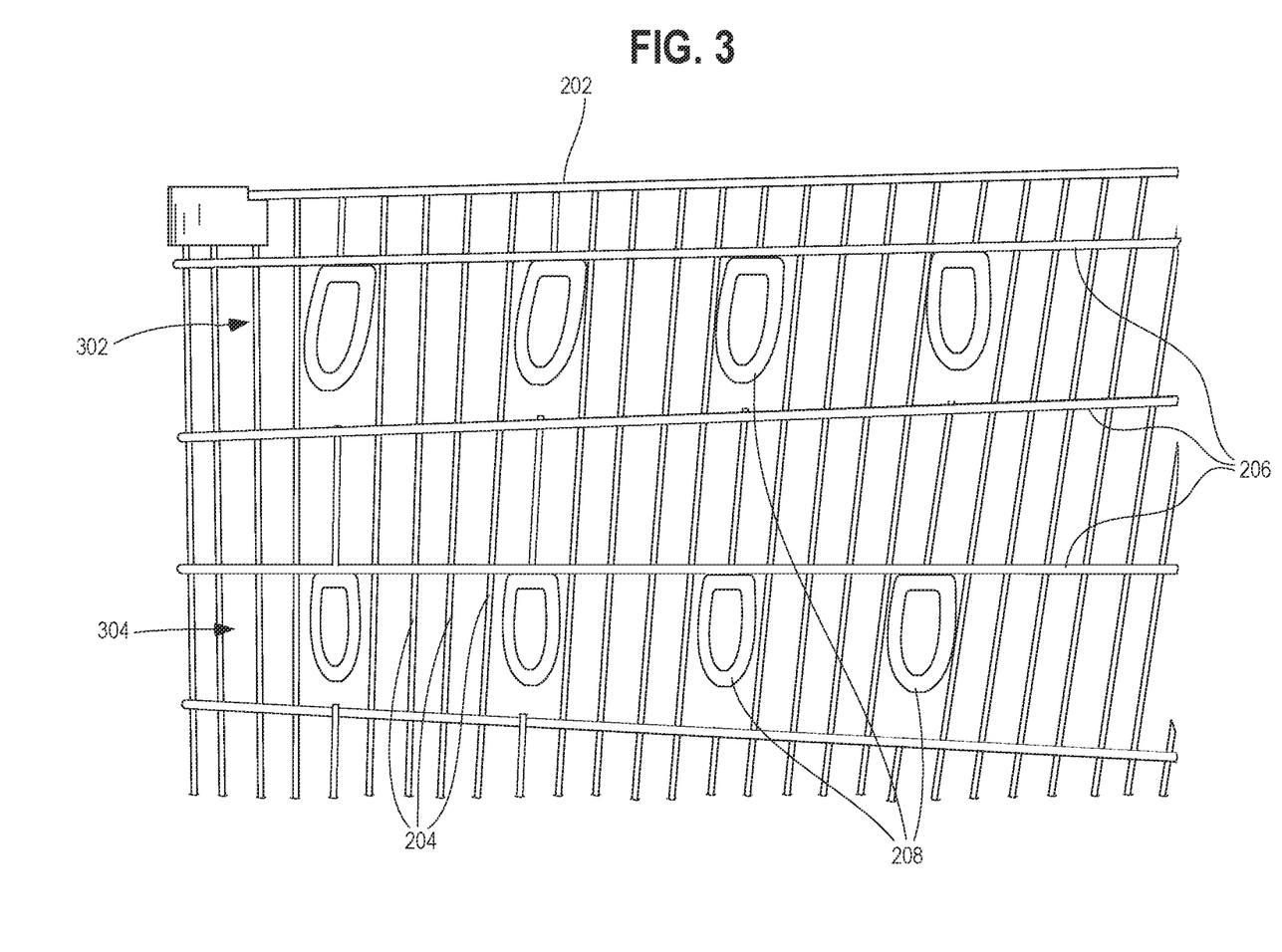
FIG. 3 depicts a lateral side wall of a shopping cart in accordance with an exemplary embodiment.

FIG. 3 depicts a lateral side wall of a shopping cart in accordance with another exemplary embodiment. In FIG. 3, instead of the loop attachment mechanisms 208 being laterally offset between rows 302, 304, loop attachment mechanisms are arranged so as to be in the same lateral locations in each row and to include four loop attachment mechanisms in each row. It will be appreciated that shopping carts having more than two rows of bag attachment mechanisms per side wall and other numbers of bag attachment mechanisms than those specifically discussed herein are also within the scope of the present invention.

Figure 4:
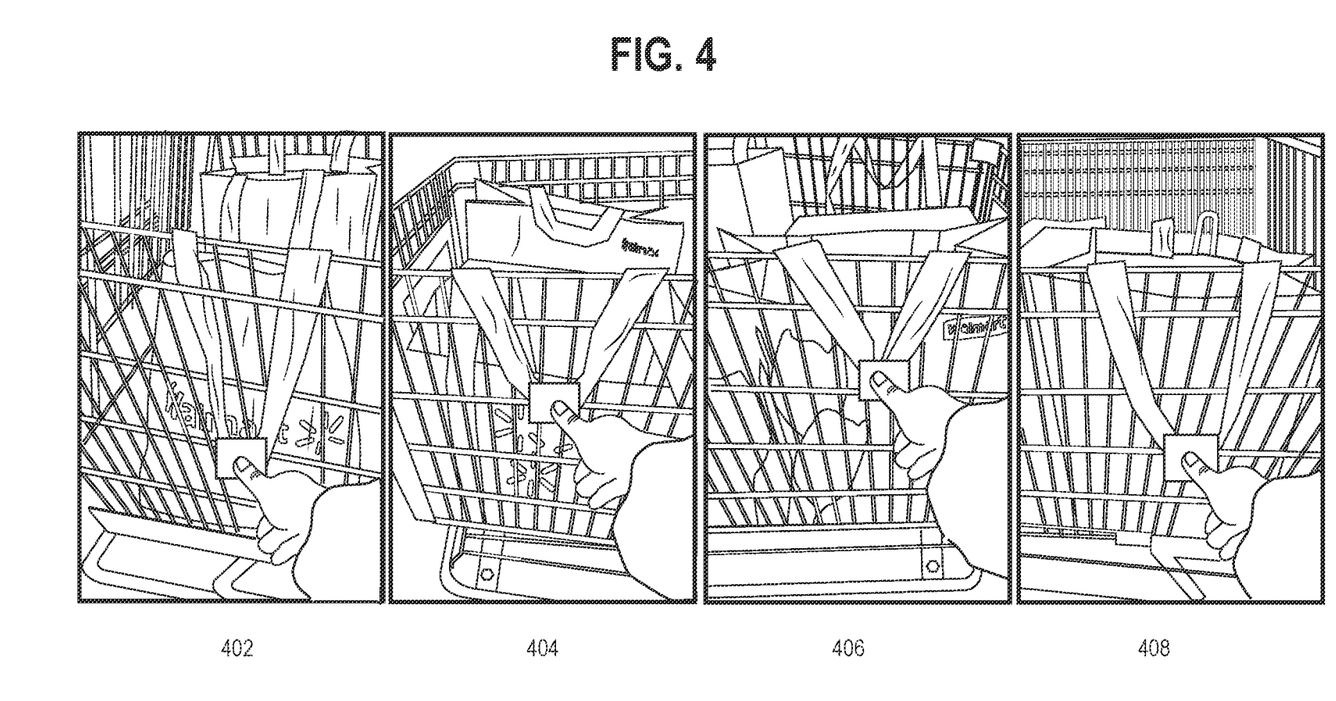
FIG. 4 depicts exemplary bag types suitable for use in exemplary embodiments.

As noted above, the providing of loop attachment mechanisms (and other types of bag attachment mechanisms) in varying locations on side walls of a shopping cart facilitates the use of different size bags with different length bag handles. FIG. 4 depicts exemplary bag types suitable for use in exemplary embodiments. For example, the bag attachment mechanisms described herein enable the use of bags that are medium wide with soft sides 402, collapsible soft bins 404, medium wide bags with stiff sides 406 and medium tall bags with stiff sides 408. It will be appreciated that additional types of bags not specifically referenced may also be used with embodiments of the present invention.

Figure 5:
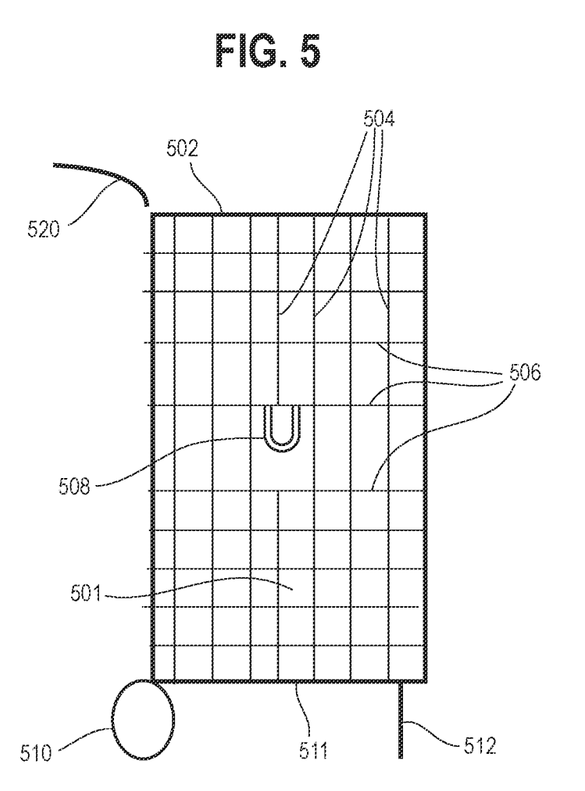
FIG. 5 depicts a mobile shopping basket in an exemplary embodiment.

The bag attachment mechanisms described herein may also be used to modify other types of shopping baskets in addition to the shopping carts described above. For example, FIG. 5 depicts a mobile shopping basket in an exemplary embodiment. The exemplary mobile shopping basket includes two wheels 510 and a stand support 512 supporting a frame 511. The frame 511 may support a basket that includes a lateral side wall 501. Lateral side wall 501 may include a top edge 502, first vertically oriented supports 504 and second lateral supports 506. A bag attachment mechanism 508, such as the downward facing loop mechanism, clipping mechanism or hook mechanism such as those previously described may also be provided. The bag attachment mechanism 508 may be located substantially within the plane of lateral side wall 501. Additional bag attachment mechanisms may also be provided on the other side walls (not shown) of the mobile shopping basket. The mobile shopping basket may also include a handle 520 for tilting the basket onto its wheels for transport.

The description herein is presented to enable a person skilled in the art to create a shopping cart or mobile shopping basket with bag attachment mechanisms. Various modifications to the example embodiments will be readily apparent to those skilled in the art, and the generic principles defined herein may be applied to other embodiments and applications without departing from the spirit and scope of the invention. Moreover, in the description, numerous details are set forth for the purpose of explanation. However, one of ordinary skill in the art will realize that the invention may be practiced without the use of these specific details. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

I claim:
1. A shopping cart, comprising:
    a frame,
    a set of four wheels mounted on and supporting the frame;
    a basket supported by the frame, the basket including:
        a bottom wall,
        a front side wall, a rear side wall, a first lateral side wall and a second lateral side wall, each side wall including a top edge and defining a plane extending below and away from the top edge,
        a plurality of first supports for each side wall extending away from the top edge in the direction of the side wall,
        a plurality of second supports extending laterally across each side wall, the plurality of second supports extending in a direction substantially perpendicular to a direction of the first supports, and
        at least one loop attachment mechanism projecting downward in a direction away from a top edge of the first lateral side wall and located substantially within the defined plane of the first lateral side wall, the at least one loop attachment mechanism located below the top edge of the first lateral side wall.

2. The shopping cart of claim 1 wherein the at least one loop attachment mechanism is connected to one of the plurality of second supports.

3. The shopping cart of claim 2 wherein the at least one loop attachment mechanism is integrated into one of the second supports.

4. The shopping cart of claim 1 further comprising:
at least two loop attachment mechanisms projecting downward in a direction away from the top edge of the first lateral side wall and located substantially within the defined plane of the first lateral one side wall, the at least two loop attachment mechanisms located below the top edge of the first side wall.

5. The shopping cart of claim 1, further comprising:
at least two rows of loop attachment mechanisms, each row including at least two loop attachment mechanisms, the two loop attachment mechanisms projecting downward in a direction away from the top edge of the first lateral side wall and located substantially within the defined plane of the first lateral one side wall, the at least two loop attachment mechanisms located below the top edge of the first side wall, the at least two rows of loop attachment mechanisms located at two different distances below the top edge of the at least one side wall.

6. The shopping cart of claim 5, wherein a first row of loop attachment mechanisms includes 3 loop attachment mechanisms and a second row of loop attachment mechanisms includes 2 loop attachment mechanisms, the first row of loop attachment mechanisms located nearer to the top edge of the side wall than the second row of loop attachment mechanisms.

7. The shopping cart of claim 5, wherein a first row of loop attachment mechanisms includes 2 loop attachment mechanisms and a second row of loop attachment mechanisms includes 3 loop attachment mechanisms, the first row of loop attachment mechanisms located nearer to the top edge of the side wall than the second row of loop attachment mechanisms.

8. The shopping cart of claim 1, further comprising:
at least one loop attachment mechanism projecting downward in a direction away from a top edge of a second lateral side wall and located substantially within the defined plane of the second lateral one side wall, the at least one loop attachment mechanism located below the top edge of the second lateral side wall.

9. The shopping cart of claim 1, further comprising: at least one loop attachment mechanism projecting downward in a direction away from a top edge of the front side wall and located substantially within the defined plane of the front wall, the at least one loop attachment mechanism located below the top edge of the front side wall.

10. The shopping cart of claim 1, further comprising:
at least one loop attachment mechanism projecting downward in a direction away from a top edge of the rear side wall and located substantially within the defined plane of the rear side wall, the at least one loop attachment mechanism located below the top edge of the rear side wall.

11. The shopping cart of claim 1, wherein the at least one loop attachment mechanism is located in a gap in the first lateral side wall, the gap being provided by removal of a portion of one of the first supports.

12. A shopping cart, comprising:
a frame,
a set of wheels mounted on and supporting the frame;
a basket supported by the frame, the basket including:
a bottom wall,
a front side wall, a rear side wall, a first lateral side wall and a second lateral side wall, each side wall including a top edge and defining a plane extending below and away from the top edge,
a plurality of first supports for each side wall extending away from the top edge in the direction of the side wall,
a plurality of second supports extending laterally across each side wall, the plurality of second supports extending in a direction substantially perpendicular to a direction of the first supports,
at least one clipping mechanism or hook mechanism located below the top edge of the first lateral side wall and located substantially within the defined plane of the first lateral side wall and configured to secure a handle of a bag extending over the top edge of the first lateral side wall.

13. The shopping cart of claim 12, wherein the clipping mechanism or hook mechanism is located substantially within the defined plane of the first lateral side wall.

14. The shopping cart of claim 12, wherein the clipping mechanism is a spring clip.

15. The shopping cart of claim 12, further comprising:
at least one clipping mechanism or hook mechanism located below a top edge of the front side wall, rear side wall or second lateral side wall.

16. A wheeled shopping basket, comprising:
a frame,
a set of two wheels mounted on and supporting the frame;
a basket supported by the frame, the basket including:
a bottom wall,
a front side wall, a rear side wall, a first lateral side wall and a second lateral side wall, each side wall including a top edge and defining a plane extending below and away from the top edge,
a plurality of first supports for each side wall extending away from the top edge in the direction of the side wall,
a plurality of second supports extending laterally across each side wall, the plurality of second supports extending in a direction substantially perpendicular to a direction of the first supports, and
at least one loop attachment mechanism projecting downward in a direction away from a top edge of the first lateral side wall and located substantially within the defined plane of the first lateral side wall, the at least one loop attachment mechanism located below the top edge of the first lateral side wall.

17. The wheeled shopping basket of claim 16, further comprising:
at least one loop attachment mechanism located below a top edge of the front side wall, rear side wall or second lateral side wall.

18. The wheeled shopping basket of claim 16, further comprising:
at least two rows of loop attachment mechanisms, each row including at least two loop attachment mechanisms, the two loop attachment mechanisms projecting downward in a direction away from the top edge of the first lateral side wall and located substantially within the defined plane of the first lateral one side wall, the at least two loop attachment mechanisms located below the top edge of the first side wall, the at least two rows of loop attachment mechanisms located at two different distances below the top edge of the at least one side wall.

19. The wheeled shopping basket of claim 18, wherein a first row of loop attachment mechanisms includes 3 loop attachment mechanisms and a second row of loop attachment mechanisms includes 2 loop attachment mechanisms, the first row of loop attachment mechanisms located nearer to the top edge of the side wall than the second row of loop attachment mechanisms.

20. The wheeled shopping basket of claim 18, wherein a first row of loop attachment mechanisms includes 2 loop attachment mechanisms and a second row of loop attachment mechanisms includes 3 loop attachment mechanisms, the first row of loop attachment mechanisms located nearer to the top edge of the side wall than the second row of loop attachment mechanisms.

\* \* \* \* \*